(12) United States Patent
Creasy (10) Patent No.: US 6,251,809 B1
(45) Date of Patent: *Jun. 26, 2001

(54) COMPOSITE MATERIALS WITH HIGHLY ALIGNED DISCONTINUOUS FIBERS, AND METHODS OF PREPARATION THEREOF

(76) Inventor: Terry S. Creasy, 11660 Texas Ave., #202, Los Angeles, CA (US) 90025

( * ) Notice: Subject to any disclaimer, the term of this patent is extended or adjusted under 35 U.S.C. 154(b) by 0 days.

This patent is subject to a terminal disclaimer.

(21) Appl. No.: 09/182,594

(22) Filed: Oct. 30, 1998

(51) Int. Cl.<sup>7</sup> .................................................. D03D 15/00
(52) U.S. Cl. ..................... 442/209; 442/187; 442/208; 442/210; 442/212; 442/213; 442/219; 442/220; 442/229; 428/196; 428/198
(58) Field of Search ..................... 428/196, 198; 442/187, 208, 209, 210, 212, 213, 219, 220, 229

(56) References Cited

U.S. PATENT DOCUMENTS

| | | | |
|---|---|---|---|
| 4,460,633 | * 7/1984 | Kobayashi et al. | 428/110 |
| 4,574,107 | * 3/1986 | Ferrari | 428/569 |
| 5,212,010 | * 5/1993 | Curzio et al. | 428/260 |
| 5,888,609 | * 3/1999 | Karttunen et al. | 428/107 |

* cited by examiner

Primary Examiner—Terrel Morris
Assistant Examiner—Ula C. Ruddock
(74) Attorney, Agent, or Firm—Robert J. Schaap (57) ABSTRACT

A composite material includes a highly aligned discontinuous fibers. The material comprises a plurality of substantially aligned warp fibers which have been woven about a plurality of weft filaments, each warp fiber having a series of crossover points with adjacent warp fibers. A plurality of matrix polymer filaments are associated with the warp fibers, the polymer matrix filaments having been treated such that each warp fiber adheres to the matrix polymer filament at least the crossover points such that the warp fibers are attached to each other at the crossover points. A series of patterned cuts having preselected characteristics are made in at least some of the warp fibers. The invention is also for a method of making a composite material with discontinuous fibers.

39 Claims, 11 Drawing Sheets

COMPOSITE MATERIALS WITH HIGHLY ALIGNED DISCONTINUOUS FIBERS, AND METHODS OF PREPARATION THEREOF

BACKGROUND AND FIELD OF THE INVENTION

This invention relates to composite materials with highly aligned discontinuous fibers, and a method for preparing such composites.

In the weaving of composite fibers, it is common to employ a loom. Typically, the loom includes a supply of filament or fiber materials which are arranged on a beam or a creel. The creel is loaded with a plurality of spools or bobbins upon which the filament or fiber is wound, and from which the filament or fiber can be extended onto the weaving area. The creel thus supplies continuous fiber to the loom. In conventional systems, a substantially large number of bobbins or spools containing the filament can be loaded on to the creel.

Each filament is thread through a comb and an appropriate harness heddle, extended across a loom bed which forms part of the loom, and is held in a pin block. The pin block is drilled with a plurality of holes each of which is designed to accept a filament extending from the creel. A steel pin or other suitable means is used to wedge a filament in the hole and therefore to ensure that it remains securely fixed across the loom bed. The filaments may be fastened to a cloth beam, which winds up material. Alternately, they may be securely fixed across the loom bed in an otherwise acceptable manner.

The plurality of filaments which extend across the loom bed are referred to as the warp. The heddle, which is one of a set of parallel cords or wires that when mounted compose the harness, is used to guide the warp filaments to facilitate weaving. Thus, a particular warp filament, or set of warp filaments, is raised or lowered over the loom bed with respect to other filaments or sets of filaments. According to conventional weaving technology, a complement of filaments or fibers is raised or lifted by two or more harnesses on the loom, creating a space with respect to another complement of fibers and in which a shuttle trailing a fiber is able to pass. Those fibers interspaced between the complements of warp filaments are known as the weft fibers, or weft, and run at angles which are typically transverse to those of the warp filaments. The weft passes between fiber groups, keeping them separate. The positions of the harnesses alternate in a continuing cycle, and between each change of position of each fiber set, a weft is introduced between the warp filaments. The repetition of this cycle and the introduction of the weft between each change repeats as necessary to create the woven ply or panel.

SUMMARY OF THE INVENTION

In one aspect, the present invention is directed towards the production of a composite material having highly aligned discontinuous fiber arrays. Such discontinuous fiber arrays are of importance in that their study leads to an increased understanding of basic principles behind the forming process of such fiber arrays. Additionally, highly aligned discontinuous fiber arrays have been shown to possess not only improved strength and an ease of processing, but also the ability to create fiber arrays with properties tailored for specific applications.

The invention comprises a composite material of continuous warp filaments which have been woven, the warp filaments comprising a reinforcing fiber and an associated matrix polymer which may be either thermoplastic or thermoset. The matrix polymer may be interspersed with the reinforcing fiber or the reinforcing fiber may be coated with the thermoplastic or thermoset matrix polymer. The continuous filaments form a warp in a loom and are woven into a desired pattern using a weft which holds the warp filaments apart in a specific manner and pattern. The weft may be a polymer filament which can remain in the composite and the completed product, or it may be a removable filament which is extracted from the fabric once the fabric has been stabilized as will be discussed below. With the filament warp and weft woven into a specific pattern, a preconsolidation follows whereby the polymer may be treated with heat and/or pressure to stabilize the fabric. Once stabilized, at least some of the continuous filaments are cut in selected locations. Stabilization of the material ensures that it will not disintegrate or fall apart once these selected fibers have been cut. The weft, if removable, is withdrawn at this stage. If the weft is to remain in the finished product, the warp cut preferably passes through selected warp fibers, and a part of the way through the weft, leaving the warp fibers below the weft intact.

In another aspect of the invention, the warp may be comprised of a reinforcing fiber filament, either monofilament or tow, and a matrix polymer filament which may be either thermoplastic or an incompletely cured thermoset. Once more, the matrix polymer filament may also be a monofilament or tow. Additionally, various combinations and commingling of the different types of reinforcing fiber filament and matrix polymer filaments may be used. The polymer-coated reinforcing fibers may be continuous or discontinuous, but, if discontinuous, are bonded together by the polymer to form a continuous strand.

In another aspect, the invention also discloses the use of a weft material which may be comprised of a polymer sheet, rod, plate, filament or wire. As appropriate, the weft may be thermoplastic or thermoset. When the weft is a sheet, rod, plate, filament, wire or the like, it may be made of metal, ceramic or glass. Furthermore, the weft in any one application need not be confined to one type of material or shape, but may be any one of a number of combinations of the materials mentioned above.

With the various types of warp, weft and matrix polymer filament materials described above, or any combination thereof, the preconsolidation takes place in substantially the same way as with the use of a regular reinforcing fiber and polymer filament. The heat and pressure in the preconsolidation step makes the fabric stable, allowing cutting of selected fibers without the fabric falling apart. The weft may be removable and withdrawn once the warp fibers are cut, or the weft may remain so that the cut passes through the warp fibers and also part of the way through the weft, leaving intact the warp fibers below the cut. With respect to the thermoplastic matrix polymers which may be used, these soften or melt during the preconsolidation stage. Where thermoset materials are used, alone or in combination with other materials, they receive a staging treatment that allows them to flow and then cure during further processing.

Looms allow for control of specific fiber placement in woven fabrics with continuous warp filaments. As mentioned above, the warp fibers are strands of thread that run from many spools on the creel, through the loom bed for weaving, and finally wind around a take-up roll as part of the finished fabric. The harness/pedal set-up permits predetermined patterns in the finished fabric by lifting specific warp fibers from the array before the shuttle adds the weft fiber. For the most part, the weft fibers run perpendicular to the warp, keeping the warp strands or fibers separate as the harnesses change position. The patterns produced in the woven fabric are the result of warp fibers which have varied lengths appearing on one side of the fabric.

The warp fiber composite, which is preferably comprised of a filament and associated matrix polymer material, can each be chosen from a wide selection of materials depending on the pattern required, and the ultimate use of the material. Fibers may be carbon, glass, Kevlar, nylon, polyethylene or other reinforcing filaments. They may be used as a single fiber type within the weave in both warp and weft positions, or, two or more of these fibers can be combined to produce the reinforcement. For example, carbon and Kevlar may be combined in the warp direction with carbon or Kevlar alone or in combination used as the weft. The matrix can be thermoplastic material such as polyethylene, polypropylene, PEEK, PEKK nylon or other melting polymer. The matrix could also be a thermoset polymer such as phenolic, epoxy, polyester, vinyl ester or other curable resin.

In another composite, nylon fibers may be added to polyethylene (PE). The nylon filament, preferably about 0.51 mm in diameter, is used in conjunction with a polyethylene film, approximately 1.0 mil thick, which acts as a matrix.

DETAILED DESCRIPTION OF THE PREFERRED EMBODIMENTS

Reference is now made to the accompanying drawings, showing various aspects and preferred embodiments of the present invention.

Figure 1:
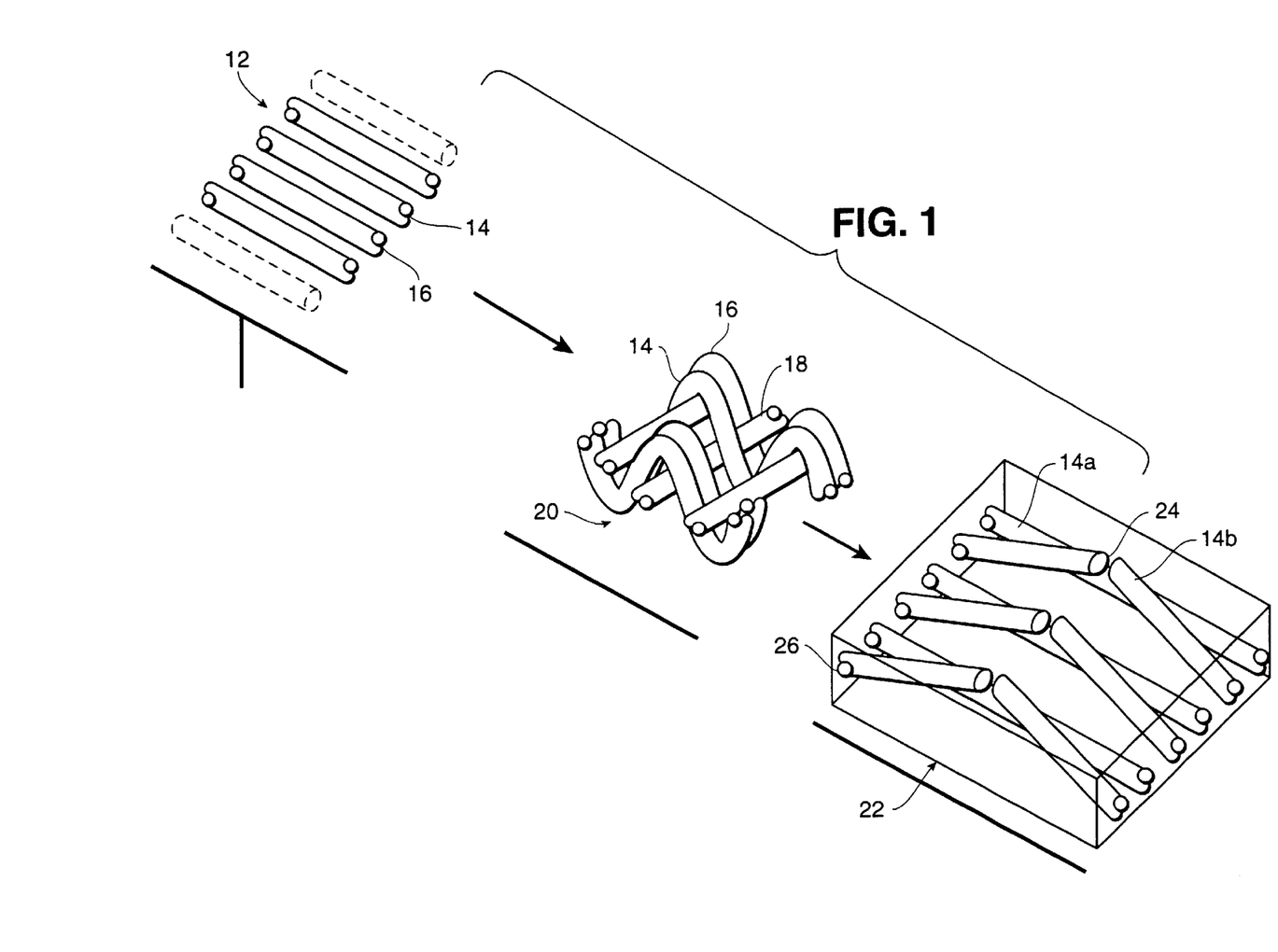
FIG. 1 is a diagrammatic representation showing a weaving process and composite material of the invention.

FIG. 1 shows a general diagrammatic representation of one embodiment of the present invention. The warp, generally indicated by numeral 12, consists of reinforcing fibers 14 of a continuous nature supplied from a bobbin on a creel, the reinforcing fibers 14 being staggered or alternating with a thermoplastic or thermoset polymer filament 16. Both the reinforcing fibers 14 as well as the thermoplastic or thermoset polymer filaments 16 may be comprised of either a monofilament or tow. The reinforcing fibers 14 and polymers 16 are introduced over a loom bed, and, if necessary, straightened to remove any curl resulting from tight winding on the bobbin, as will be described below. The reinforcing fiber 14 and polymer filaments 16 are appropriately connected through a comb and heddle so that a first set of reinforcing fibers 14 and polymer filaments 16 can be raised with respect to a second set. In this position, a weft filament, running substantially transverse to the warp 12, is introduced. Thereafter, the first and second sets of warp filaments are moved into the alternate or second position and a further weft filament 18 introduced. Successive changes of the pedal and harness position alternately raise and lower the first and second sets of warp filaments respectively, and the introduction of the weft filaments between each change results in the weaving of the fabric forming the composite. FIG. 1 shows the woven material 20 with the reinforcing fiber 14 and polymer filaments 16 running in one direction, and the interconnected weft 18 in a transverse direction. As will be discussed more fully below, a wide variety of designs or patterns can be achieved depending on the manner in which the warp filaments are attached to the heddle and harness in the formation in the first and second sets of warp filaments.

The weft filaments 18 may be comprised of a polymer filament which may remain in the composite after preconsolidation and curing, as described below. However, the weft filaments 18 may also be subsequently removed upon stabilization of the fabric and the severing of certain of the warp reinforcing fibers.

The final stage of the diagrammatic representation of FIG. 1 shows preconsolidation of the thermoplastic or thermoset polymer filament 16 with heat and pressure to effect stabilization of the fabric. One of the effects of the stabilization of the fabric in the preconsolidation stage is that the polymer filament 16 (or matrix) holds the weave together at the points where the warp fibers 12 cross over from the "bottom" of the woven material or fabric 20 to the "top" thereof. This effect is discussed and illustrated below. Thus, the subsequent cutting or severing of reinforcing fiber will not result in the disintegration of the fabric since the filaments become bonded or fused to each other at the crossover points.

"Continuous" fibers bridge each gap from one glued fiber crossing to the next. A discontinuous fiber is one which has been severed or cut, as illustrated in the preconsolidated material 22 in FIG. 1. Alternate reinforcing fibers 14a are unsevered or continuous, while the remaining alternate fibers 14b have been severed at cut 24. The fused crossover points 26 preserve the integrity of the material by preventing unravelling after the selected reinforcing fibers 14b have been severed at the cuts 24.

The preconsolidation stage, shown with reference to the preconsolidated material 22 in FIG. 1, is also the stage at which the weft filaments 18, if removable, are withdrawn from the material. The cutting of the selected filaments 14b facilitates withdrawal of the weft 18 which can then be removed leaving intact the uncut reinforcing fibers 14a below the cut.

The cutting of selected fibers results, of course, in the discontinuous fiber composite. A wide variety of warp fiber patterns can be produced during the looming and weaving process, and this factor, coupled with the ability to sever selected fibers at preselected points and at predetermined angles, permits the advantageous fabric of the invention.

Some of the areas of control which can be exercised in establishing the final product, and tailoring it to the ultimate use for which it was made, include control of the angle of the weft. In typical applications, including the one shown in FIG. 1, the weft will run at substantially 90° or normal to the reinforcing warp fiber. However, angles less than 90° can be used. A cutting system can follow the direction of the weft and produce angled cuts in the reinforcing warp fiber. Another method of control involves the timing of cutting of the warp fibers. While the warp fibers may be conventionally cut as "on-line" during the weaving process, it is quite possible that the two operations be separated, since the reinforcing warp fibers can be cut in a later processing step using a controlled cutting machine. In this way, conventional fabrics having continuously aligned fibers may thereby be made into a discontinuous fiber composite.

Figure 2:
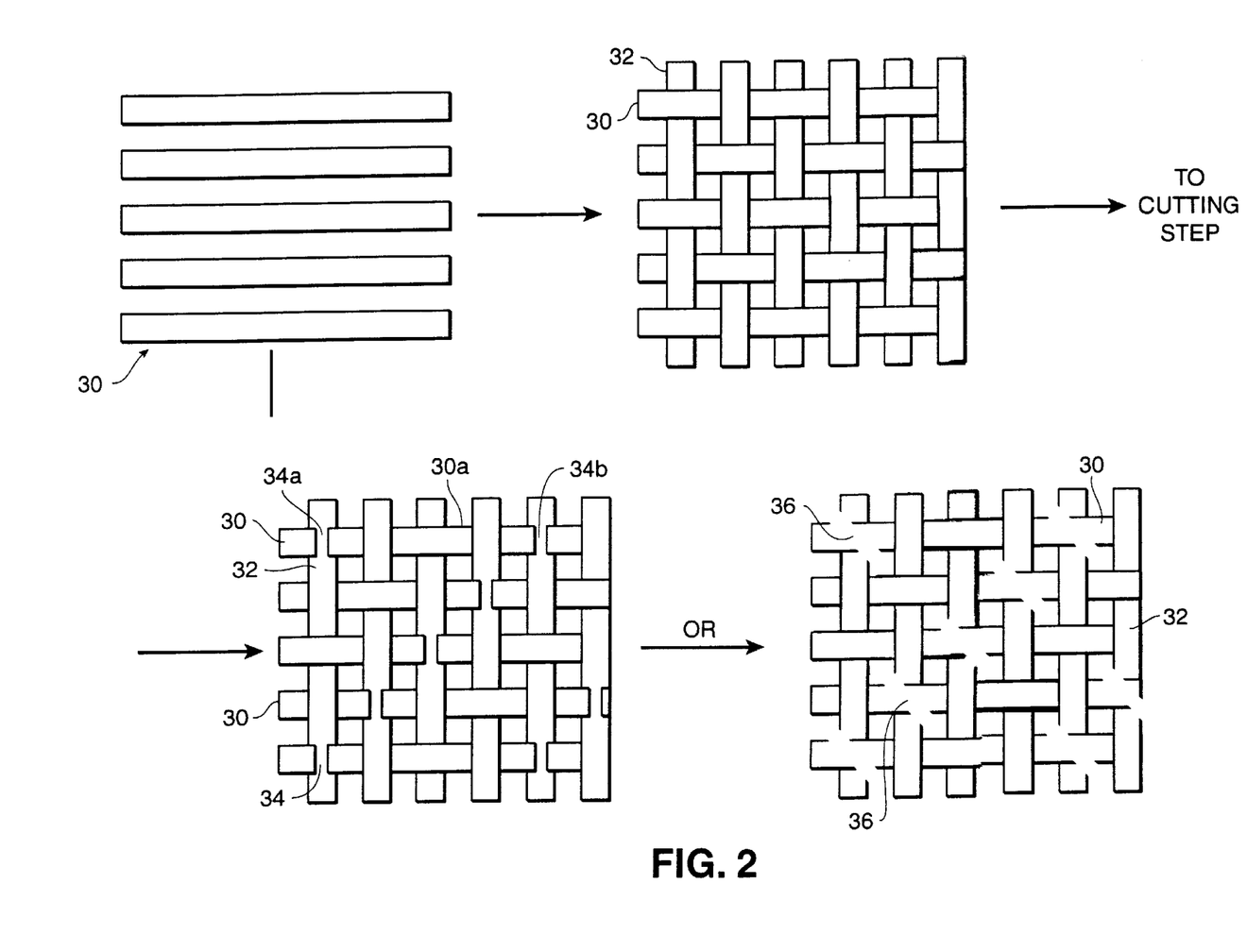
FIG. 2 is a diagrammatic representation of the process of weaving and cutting the fibers of the invention.

FIG. 2 illustrates basic weaving design, including one embodiment of cuts, as well as a variation in the cuts. A highly aligned array of reinforcing warp fibers 30 is led from the creel over the loom bed. In the weaving process, the reinforcing warp fibers 30 are sequentially raised and lowered in sets, and the weft fibers 32 are introduced, in this case at substantially 90° angles to the reinforcing warp fibers 30. Once the warp fibers 30 and weft fibers 32 have been appropriately treated and stabilized in a preconsolidation step, cutting of selected warp fibers 30 follows, as shown in the next step of FIG. 2. In a first embodiment, the warp fibers 30 are cut in a direction substantially parallel to the weft fiber 32. Each warp fiber 30 has a cut 34 above, but not below, the weft fiber 32. In the particular cutting style adopted in this illustration, a single warp fiber 30a has a first cut 34a over the weft fiber 32. At the next point where the warp fiber 30a crosses over and above the weft fiber 32, there is no cut, but the subsequent crossing of the warp fiber 30a over the next weft fiber 32 has been severed at cut 34b. All warp fibers 30 are cut in a similar manner which produces a particular style or pattern in the fabric.

As an alternative, FIG. 2 shows warp fibers 30 which have been cut above the weft fibers 32, in the same pattern or configuration, but at an angle of approximately 45 degrees to both the warp fibers 30 and the weft fibers 32. These cuts 36 once more produce a different style of pattern in the fabric, and would be used according on the ultimate application of the fabric.

Figure 3:
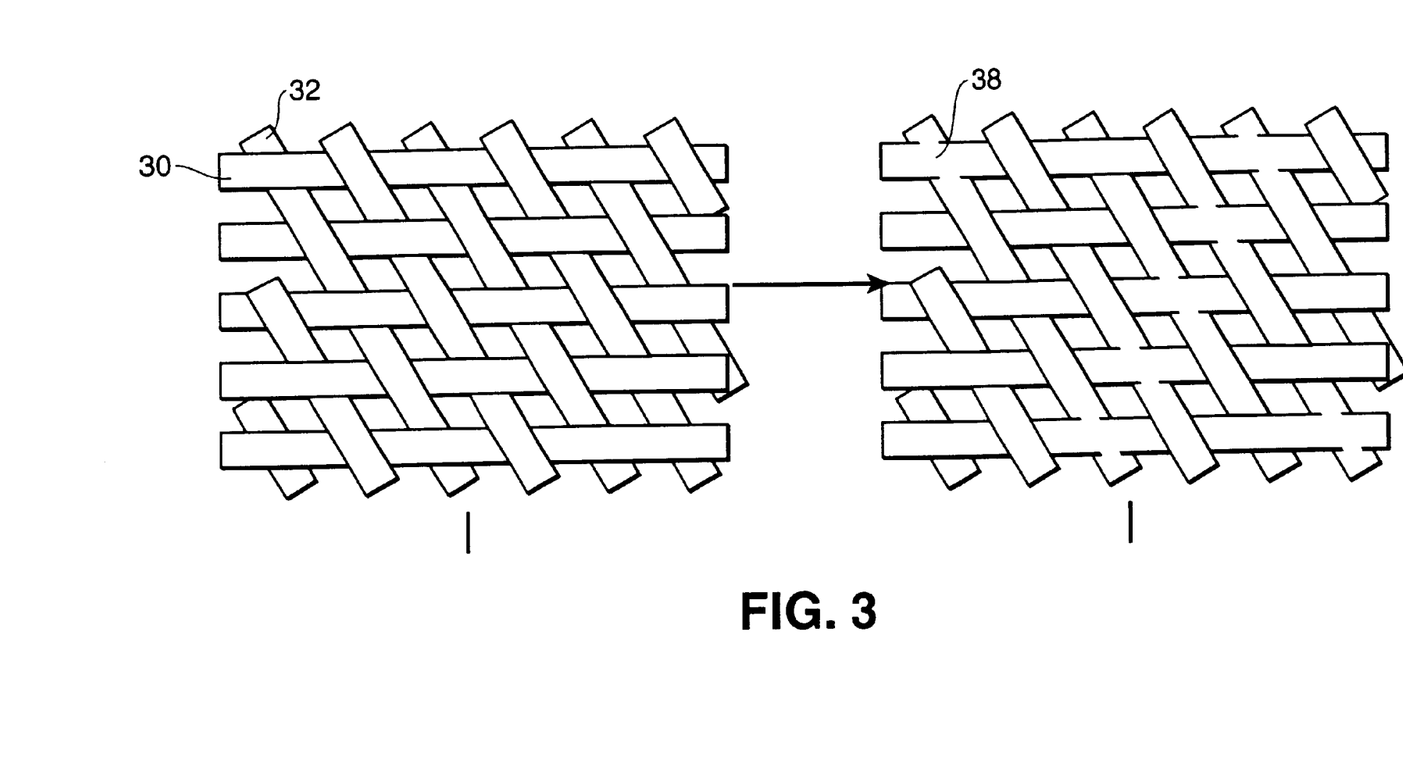
FIG. 3 is a diagrammatic representation of another embodiment of the process of weaving and cutting the fibers of the invention.

Reference is now made to FIG. 3 of the drawings. FIG. 3 is, in most respects, the same as the fabric and weaving process shown in FIG. 2, although in this embodiment the weft fibers 32 are not at 90 degrees or right angles to the warp fibers 30. In the first portion of this drawing, there is shown a highly aligned parallel array of warp fibers 30, into which has been woven a series of weft fibers 32 at an angle of about 45 degrees to the warp fibers 30. In the second portion of this Figure, the cut 38 in the warp fiber 30 is shown as being substantially parallel to the direction of the weft 32. It will, of course, be appreciated that the angle of this cut is just one of a number of options available, and other cutting angles, such as, at right angles to the warp fibers 32, may be made, depending on the required design configuration and the ultimate use of the fabric. Thus, the cutting system can produce 90° or other angled cuts in the warp, as desired. These cuts can be achieved using an automated cutting head for controlling not only the angle, but also the depth, of the cut.

It is highlighted once again that the cutting of the fibers may take place in conventional fabrics having continuous fibers in the material. Provided the fabrics have been treated in a manner to stabilize the warp fibers to prevent disintegration of the fabric after cutting, appropriate severing of the warp fibers can be made on such conventional fabrics, so that the warp fibers therein are thus rendered discontinuous by the severing.

Figure 4:
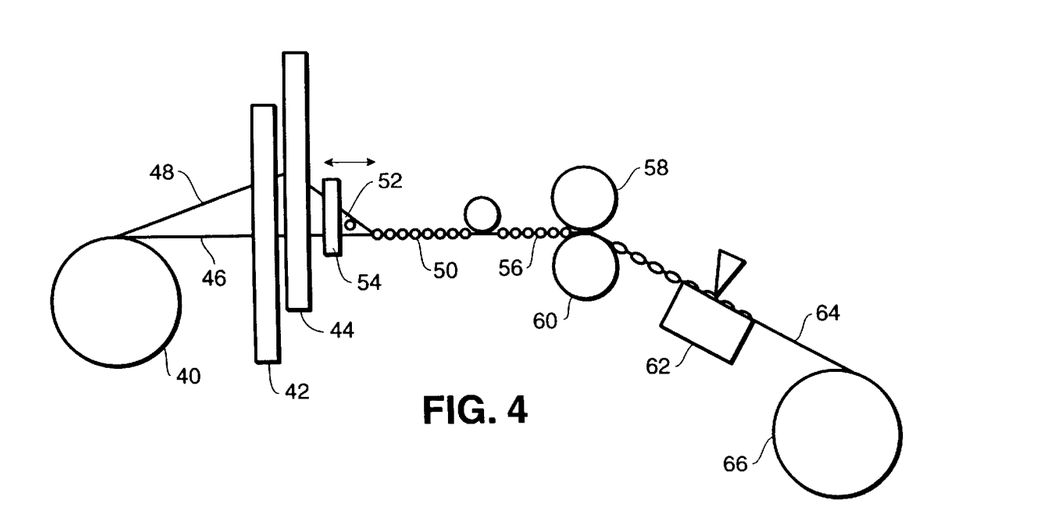
FIG. 4 is a schematic representation of the apparatus for weaving the material of the invention.

Reference is now made to FIG. 4 of the drawings which shows a diagrammatic representation of an apparatus for weaving discontinuous fiber arrays. Material is supplied from a beam or creel 40 from which a plurality of warp fibers or filaments comprising reinforcing warp fibers and thermoplastic or thermoset polymer filaments, either in monofilament form or tow, are wound off and supplied over the loom bed. Harnesses 42 and 44 are provided to control a first set 46 and a second set 48 of warp filaments respectively. The harness 42 is shown as controlling (by alternately raising and lowering) the first set of warp filaments 46, which are shown in the lowered position. The harness 44 raises and lowers the second set of warp filaments 48, and the FIG. 4 shows the second set of warp filaments 48 in the raised position. Using conventional weaving techniques, the harnesses 42 and 44 are raised and lowered with respect to each other thereby permitting successive introduction of weft filaments 50 in the space 52 created between the first and second set of warp filaments 46 and 48. A beater 54 is provided to compact the warp and weft filaments, and the extent of packing or tightness of the weave determines the fiber volume fraction. While substantial fiber volume fraction is advantageous in many applications, this parameter can, of course, be controlled and varied so that an appropriate fiber volume fraction consistent with and optimal for the ultimate application of the fabric can be achieved.

The woven fabric, designated generally at 56 passes through a pair of rollers 58 and 60 and is moved to the preconsolidation station 62. Preconsolidation would include at least the application of heat and pressure to stabilize the fabric in a manner discussed above and to sever selected fibers at preselected depths, angles and patterns, as required. A fabric of discontinuous aligned fiber emerges from the preconsolidation station 62 and is wound onto a roller 66 for further handling.

One common type of reinforcing warp filament used in the production of a fabric of the invention is a nylon filament, and this may typically be staggered with a much thinner matrix of polyethylene film. When all of the warp filaments have been jammed into place on the loom bed, a heat gun is preferably used to soften the nylon warp as these warp filaments are tightened and straightened. This step may be crucial to making straight fiber panels of woven material. The bobbins upon which the nylon filament warp have been wound usually have small diameters which sets a definite curl in the nylon. Briefly heating the nylon to approximately 180° C. converts any kinks or curls in the warp filament so as to produce a straight filament. The filaments are held taut as they cool. Not only do the straight warp filaments result in the formation of straight panels, but they assist in making the weaving process easier as well.

Figure 5A:
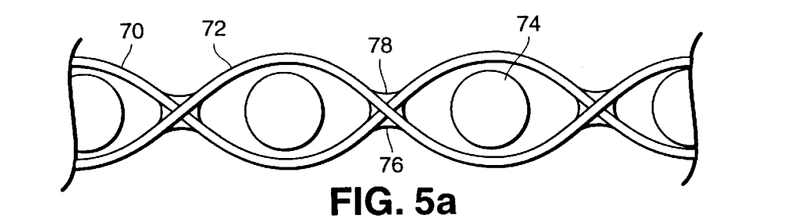
FIG. 5(a) is a diagrammatic cross-section through the weft showing the pattern of the warp thereabout.
Figure 5B:
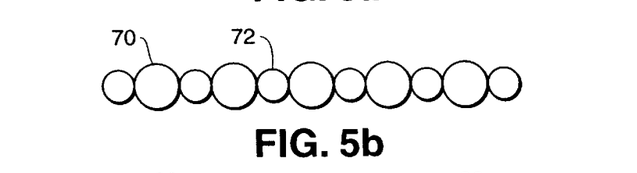
FIG. 5(b) is a cross-section of the material through the warp showing the relationship between the reinforcing fiber and polymer filament.
Figure 5C:
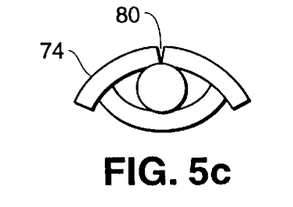
FIGS. 5(c) and 5(d) show different embodiments respectively of a cut in the reinforcing fiber.
Figure 5D:
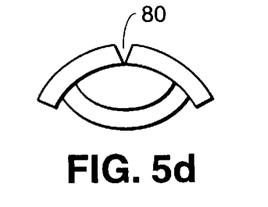
Figure 5E:
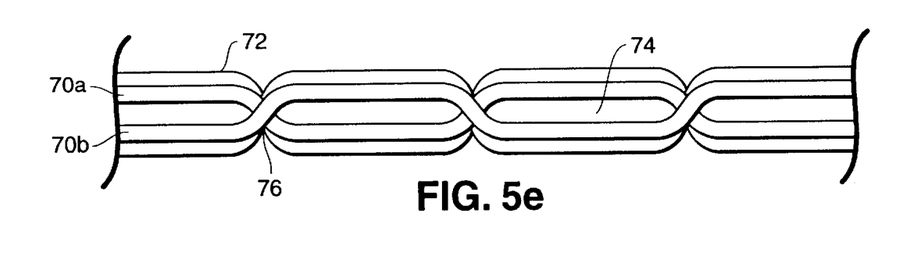
FIG. 5(e) is a diagrammatic cross-section showing a further embodiment of fiber-reinforcing material surrounded by a polymer matrix filament.

Reference is now made to FIGS. 5(a) to 5(e) of the drawings, which show in more detail the process of creating discontinuous arrays with fiber preforms. The representation in FIG. 5(a) illustrates the embodiment of a commingled matrix for use in a production method suited to an automated loom, while FIG. 5(e) shows a matrix film in a production method more suited for the manual weaving of plies or panels. In FIG. 5(a), a detail of an ideal process suited for continuous weaving on an automated loom illustrates a highly aligned and parallel series of warp reinforcing filaments comprised of a reinforcing fiber filament 70 alternated with a matrix mono-filament 72. The reinforcing fiber 70 and matrix 72 are woven in conjunction with a weft 74 to produce the ply. The reinforcing fiber 70 and matrix 72 have a series of crossover points 76, with each crossover point 76 being located between a pair of weft filaments 74. Between each weft filament 74, the matrix filaments adhere to the reinforcing fiber 70 at a fuse 78 located at the crossover points 76.

FIG. 5(b) shows a cross-section through the series of parallel aligned reinforcing film 70 and matrix 72 of FIG. 5(a). In this embodiment, the matrix filaments, or tows, pass through the loom as part of the warp, although in practice there is no need to use the harnesses to move them. In FIG. 5(a), the arrangement shown is of "continuous fibers" which bridge each gap from one glued fuse 78 at the fiber crossover point 76 to the next. With the woven filaments 70 and 72, fused at the crossover points 76, in conjunction with the weft 74, the warp can be cut to form the discontinuous fibers. With reference to FIG. 5(c), a weft filament 74 is shown and a cut 80 has been made above it. FIG. 5(c) shows the embodiment where the weft filament 74 will be removed, and its withdrawal facilitated by the cut 80. In FIG. 5(d), a cut 80 has been made, and this embodiment shows a solid matrix consolidated into a prepreg. The preconsolidation step has allowed the matrix to flow from its original filament shape into a form that fills the space between the weft fibers and bonds these weft fibers together. This type of weft is not removable and remains as part of or the whole matrix of the composite.

FIG. 5(e) shows a preferred arrangement for manual production of plies, including warp reinforcing filaments 70a and 70b, woven in conventional style using a weft 74, in this embodiment comprised of a steel plate. The warp reinforcing filaments 70a and 70b have crossover points 76. Both are surrounded by a matrix film 72 which, upon preconsolidation and appropriate treatment, stabilizes the fabric so that it will continue to have integrity after the appropriate cuts have been made. The embodiment shown in FIG. 5(e) may typically be used in a less automated system and requires that a hot-melt adhesive hold the fiber arrays together at their extreme ends. The metal weft plates 74 remain between the fibers during a preliminary consolidation of the matrix film, and the severed fibers, which would be cut at the center of each weft plate, allow these weft plates 74 to be removed. Final consolidation in a conventional manner would finish the panel.

Figure 6A:
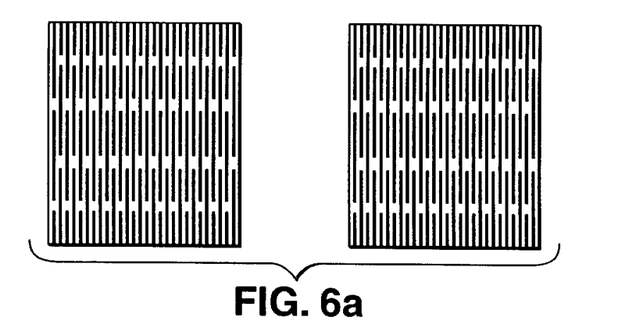
FIGS. 6(a) and 6(b) are schematic views of two embodiments respectively showing different fiber array and fiber overlap.
Figure 6B:
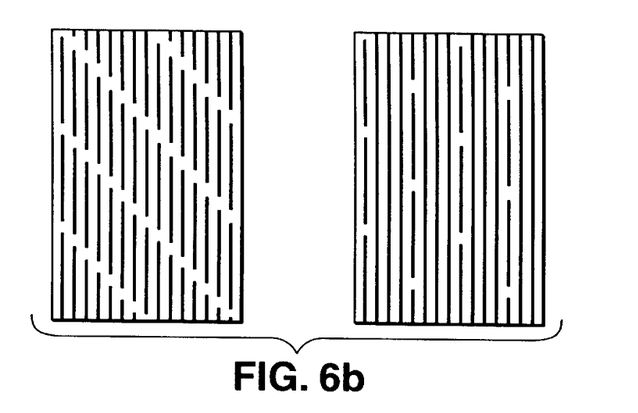
Figure 6C:
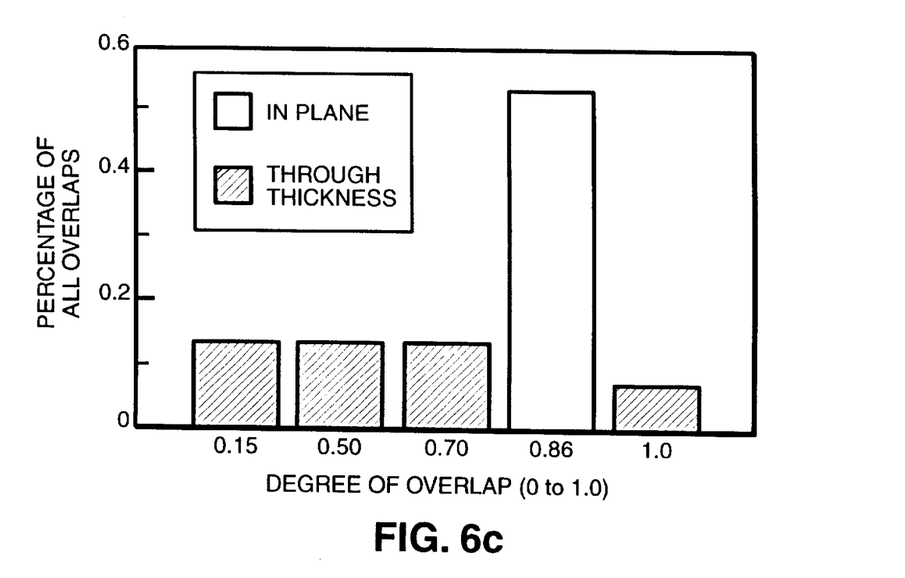
FIG. 6(c) is a graph plotting percentage of overlaps against degree of overlap for the embodiments shown in FIG. 6(b)

Reference is now made to FIGS. 6(a) and 6(b) of the invention. These Figures show views of two different embodiments of model fiber arrays. In FIG. 6(a), the fabric pattern is such that each fiber is deployed in an array where it overlaps half the length of its nearest neighbors, as shown on the left side. Stacks of these plies (namely, two or more plies arranged in a stack) produce a sheet with the half overlap pattern extending through the thickness (namely, the stacked plies) as well. Two stacked plies are shown on the right side of FIG. 6(a). In the second embodiment of a pattern shown in FIG. 6(b), the different pattern adds complexity to the material with variable fiber/neighbor overlap in the composite thickness. Within a single ply, as shown on the left side, the angle of the cut determines and fixes the amount of overlap with respect to each filament with its neighbors. In the angle shown in FIG. 6(b), the overlap fraction is 0.86 of the fiber length. Alternating the stacking of the plies with respect to the cut angle creates a distributed fiber/fiber overlap. Two stacked plies are shown on the right side of FIG. 6(b). In this arrangement, about 7% of the fibers have nearest neighbor fibers with total overlap, where their ends align. These fibers are visible in FIG. 6(b) as fibers that appear to be sitting alone in a field of continuous fibers. Since the ends of the fibers are aligned, the fibers in one layer do not bridge the gap between the fibers in the next layer and the gap still appears. The fibers that seem to be continuous are the discontinuous fibers of the two layers that overlap such that the gap between fibers in one layer is bridged by the fibers in the next. About 13% have the half overlap of the first pattern. The rest fall between these extremes with different amounts of overlap. The degree of overlap is summarized in the chart in FIG. 6(c) of the drawings. FIG. 6(c) plots the percentage of all overlaps against the degree of overlap and demonstrates that the in-plane (namely, adjacent fibers within a single ply) staggered fibers make up 53% of the population of the nearest neighbor fibers. The lightly shaded area, representing approximately 53%, is the in-plane overlap, while the darker shading representing different degrees of overlap shows the overlaps that occur as a result of the stacking of the plies.

Figure 7:
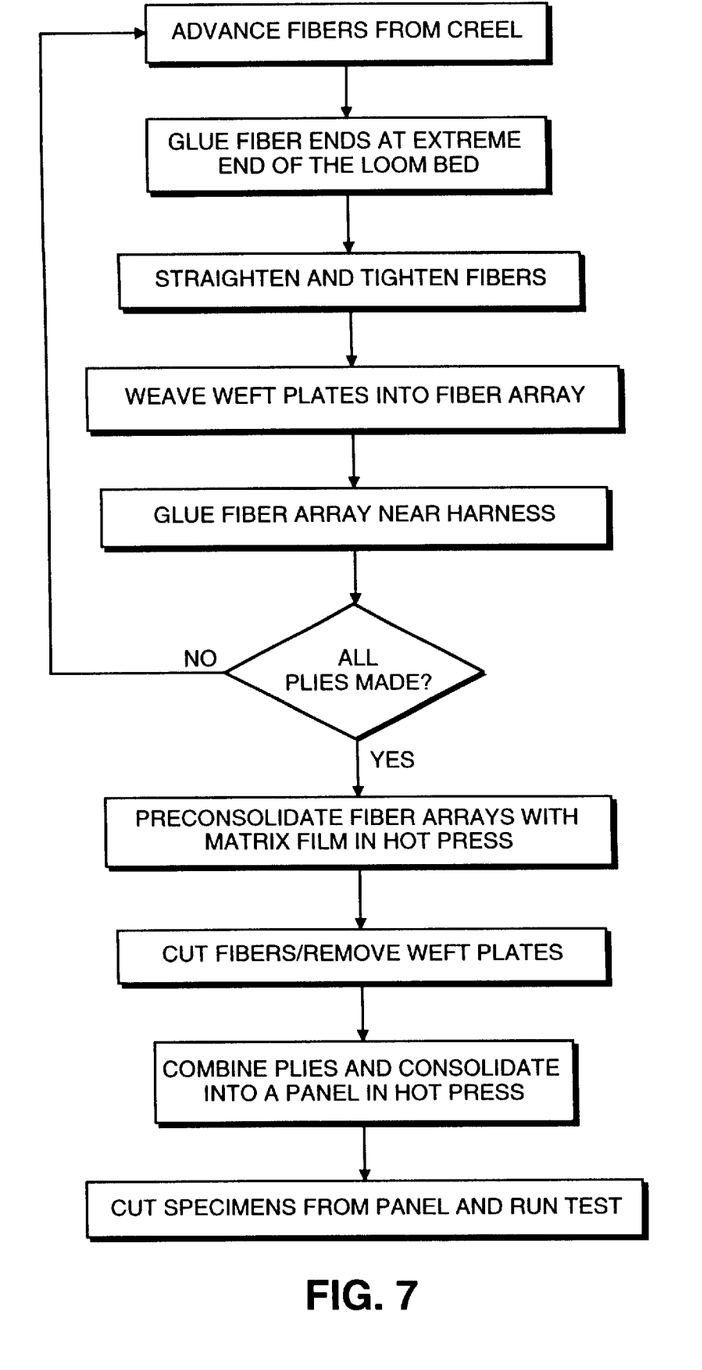
FIG. 7 is a flow chart showing the sequential steps in the manufacture of a nylon/polyethylene composite.

Reference is now made to FIG. 7 of the drawings which presents a basic flow chart of the process of the present invention. FIG. 7 shows the various steps in making a nylon/polyethylene composite. As generally described above, and now illustrated in FIG. 7, the fiber array loaded as individual fibers on a creel and thereafter aligned within the loom. The fibers are straightened. The loom lifts specified fibers as weft plates or filaments are inserted. A hot press is used to consolidate the polymer film and fibers creating the fabric stabilization which permits the subsequent cutting of the continuous fibers to form an at least partial array of discontinuous fibers. With the fibers cut, and the weft plates removed, the hot press may be used to consolidate the plies into a panel.

Figure 8:
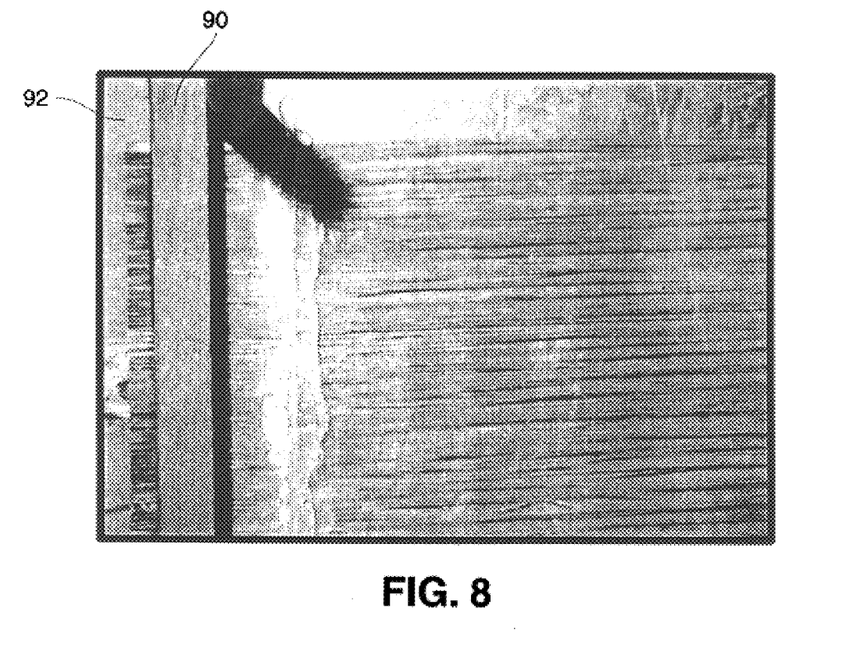
FIG. 8 is a detailed view of a loom bed showing fibers therein.
Figure 9:
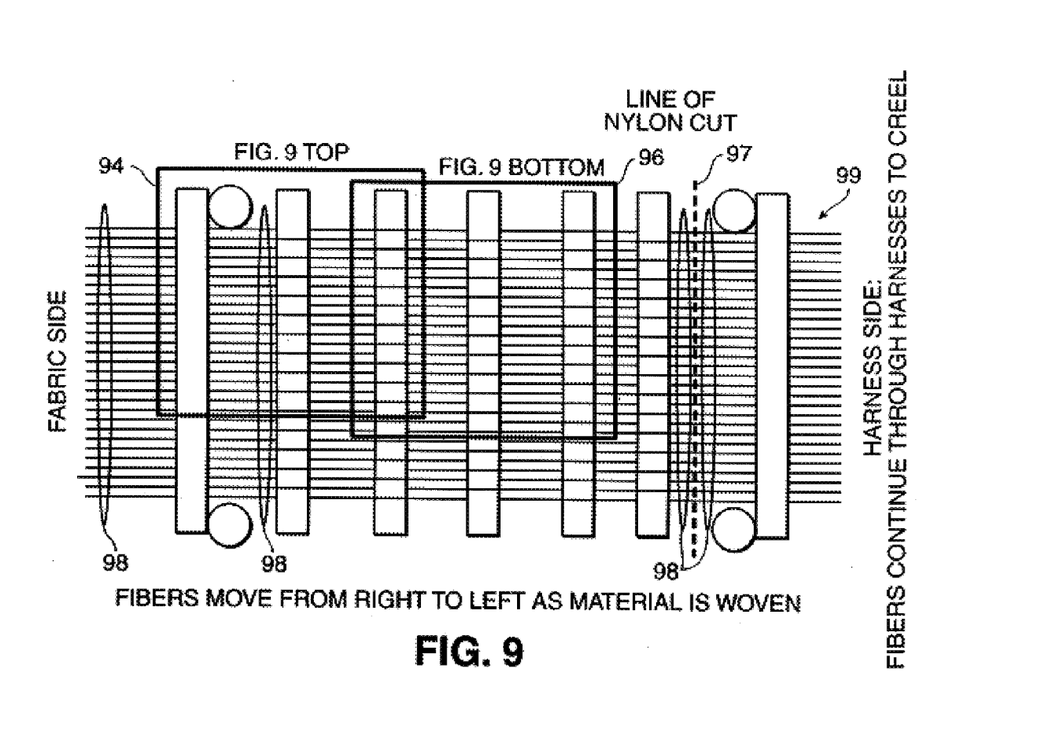
FIG. 9 is a further detail of a loom bed showing the fiber array at different locations on the loom bed.

FIG. 8 is a detailed view of the loom bed, showing fibers bonded with hot-melt adhesive at each end of a gauge length. This Figure shows the starting end of the weave bonded with the hot-melt adhesive. A clamp 90 shows the fibers held to a galvanized steel bed 92. After hot-melt covers the top of the fibers, the melt is pressed into the array and, passing down through the fibers, meets another level of solidified adhesive. These layers of hot-melt hold the fibers securely. FIG. 9, another view of the loom bed, shows the weft plates woven into the fiber array at top, shown as box 94, where the array is near the fiber clamp, and at bottom, shown as box 96, where the array is at the center of the loom bed. This Figure also illustrates the quality of the straight fibers with the weft plates in place. Short weft plates replace the long ones after all harness operations ended. The long weft plates were wider than the fabric woven and could not enter the consolidation mold used to press the plys into a composite panel. The weft plates could be switched by inserting the short plate into the long plate separated warp prior to withdrawing the long plate. With short plates in the fabric, the processing continued. Steel binder clips may be attached at each end of the short wefts to keep fibers from slipping free during storage. With the fibers held tight and straight, the hot melt 98 is also applied to the fibers at the harness end 99 of the bed.

Figure 10A:
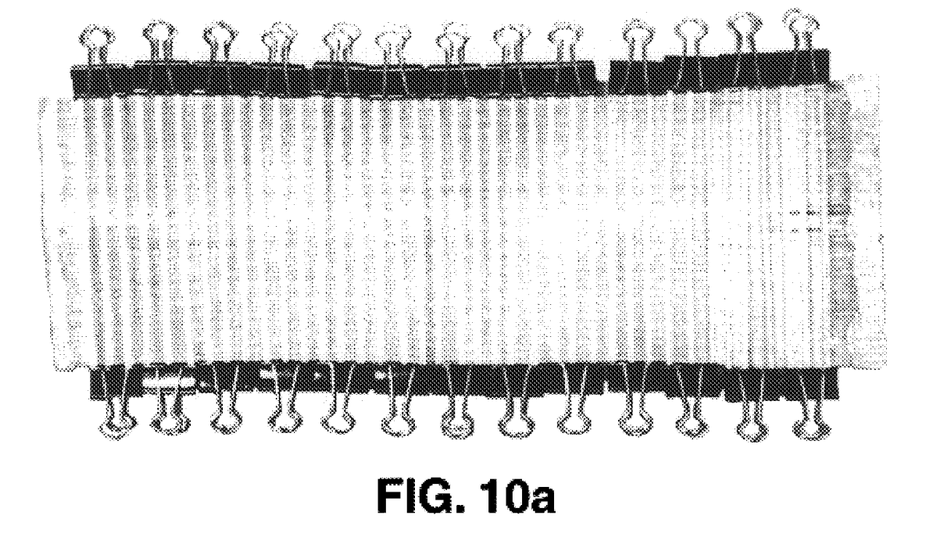
FIGS. 10(a) and 10(b) show a top view of bare fiber arrays held together with binder clips.
Figure 10B:
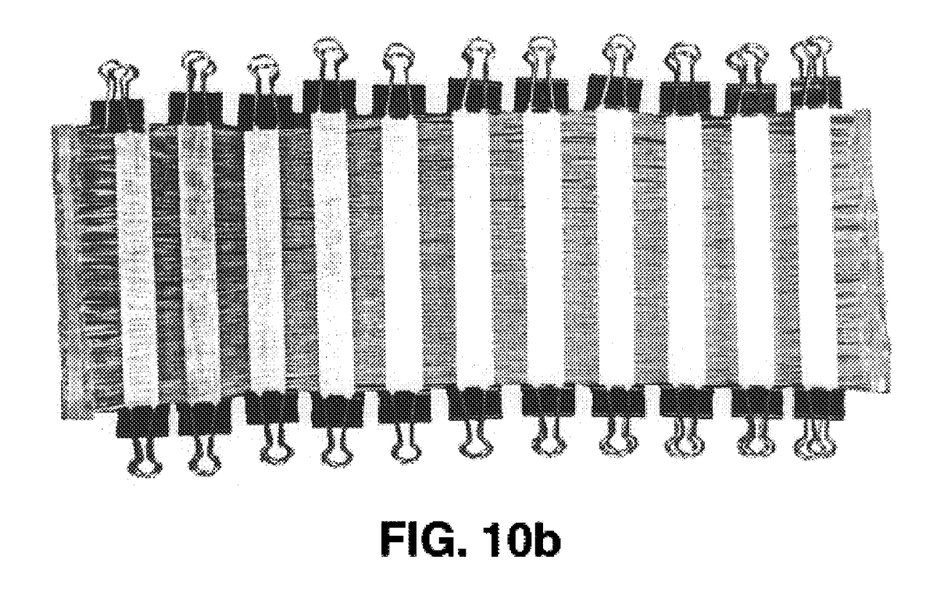

The fibers between the panel end and the harnesses receive another dose of hot-melt, and clamps are used to keep them positioned for subsequent plying. Hot-melt lines are provided and the nylon is cut at these lines in order to release the ply. In FIGS. 10(a) and 10(b), there is shown a bare fiber array with binder clips holding the weft plates in place. FIG. 10(a) shows an L/D 25 and 10(b) shows an L/D 100. L/D refers to the aspect ratio of the discontinuous fiber reinforcement. That is, it is the length of the filament divided by the filament diameter. L/D provides a measure of the reinforcing effectiveness of the discontinuous fiber. In FIG. 10(a), 39 weft plates are located in the weave, while in FIG. 10(b), there are eleven such plates.

In weaving the composite, it is important to avoid crossover errors in the array. These errors may be caused by non-synchronized replacement of certain bobbins on the creel which have emptied before others.

Figure 11A:
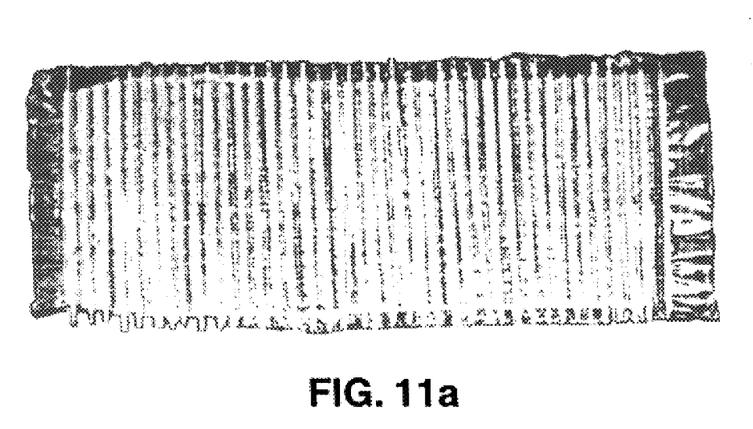
FIGS. 11(a) and 11(b) show preconsolidated fiber arrays.
Figure 11B:
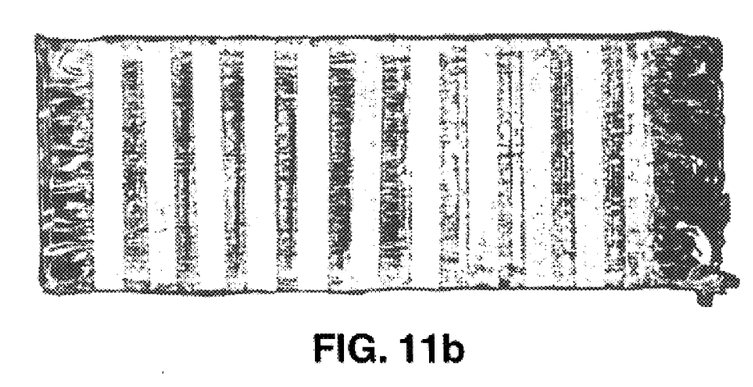
Figure 12:
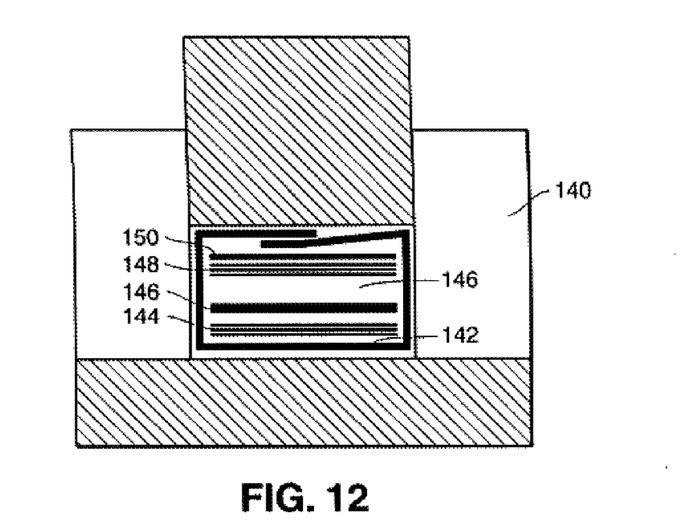
FIG. 12 is a diagrammatic representation of a window frame including multiple plies of fabric.

Consolidation of the weave is the next step in the process, and reference is made to FIGS. 11(a) and 11(b) each of which shows a preconsolidated fiber array. The warp fiber array and the weft plates are sandwiched in a polyethylene film, the array in FIG. 11(a) having an L/D 25, with the array shown in FIG. 11(b) having an L/D 100. The fiber mat may comprise eight plies of 0.025 mm thick polyethylene film. Within, for example, a picture frame, shown in FIG. 12, there may be contained a sandwich 140 comprising a bottom release film 142, the bottom four polyethylene film plies 144, the fiber mat 146, the top four polyethylene film plies 148, and a top release film 150. A pressure was applied and remained on the mold during a 45 minute water-cooling cycle, returning it to room temperature.

In those locations where the weft may lift some fibers above others, a razor blade may be used to cut these raised fibers. The bridging fibers or filaments, fused at the crossover points as described above, hold the array together after the cuts have been made. Pressing six of the preforms a second time under similar conditions produced 6-ply test panels.

The nylon/polyethylene system is one where high volume fraction highly aligned fibers in a specific overlapped pattern generate sheer-dominant flow when extended. This effect makes the system's extensional viscosity greater than the neat polymer's viscosity by changing the dominant strain from stretching to shearing. With discontinuous fiber reinforcement, sheets of the composite with a liquid matrix may be extended in the direction of the fibers. As fibers move past one another, the applied stretching deformation generates shear flow between adjacent fibers. The shear flow creates a drag on the fiber motion that increases the extensional viscosity. The induced shear strain rate, which rises directly as a factor of the fiber aspect ratio, can stimulate conformation changes, such as shear thinning and nematic/isotropic transition, in the polymer. The action of shear flow on polymers tends to align the macromolecules in the direction of the flow. With between molecular alignment, the resistance to flow (viscosity) decreases. This is called shear thinning. In the case nematic/isotropic transition, the polymer has a liquid crystal structure at rest that breaks down into an isotropic structure under high shear strain flow with a decrease in viscosity. For a fixed volume fraction of fibers, the extensional viscosity increases as the square of the fiber aspect ratio.

Fiber length is an important consideration, and the material should preferably contain the shortest possible average fiber length for the application. This keeps the viscosity increase to the smallest level needed to make a good part.

As regards fiber length distribution, a random distribution of such fiber lengths will generally improve the forming of the material. The strain rates will, of course, be different depending on the fiber and matrix used. Distributed fiber length raises the effective average fiber length, although some longer fibers have the effect of bridging gaps between shorter fibers.

The fiber control provided by a loom allows many options and varied applications in aligned fiber systems. Holding the weft fibers a specific distance apart controls and determines the fiber volume fraction. In using a loom, an effective method of controlling the fiber volume fraction can be achieved as may be apparent from reference to FIG. 5(a) of the drawings. Either a monofilament or tow matrix is interspersed with the reinforcing fiber, whereby the matrix determines the correct fiber spacing for the target volume fraction. Thus, changing the parameters of the matrix filament can be used advantageously to obtain optimal fiber volume fraction in a given application.

Figure 13A:
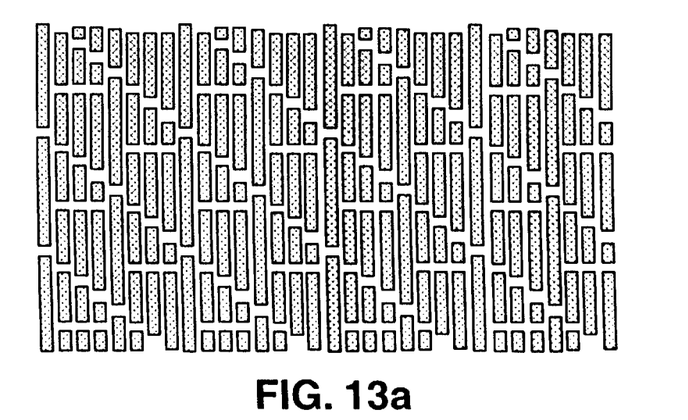
FIGS. 13(a) and 13(b) show two different embodiments of possible fiber arrays.
Figure 13B:
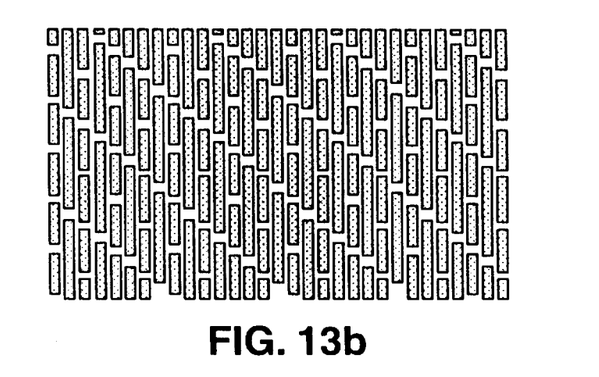

Distributed fiber lengths will generally improve the deformation properties of the composite. The deconsolidated composite comprising the nylon and polyethylene showed that the single fiber length at 0.5 overlap would fail with sufficient extension to separate all fibers. Distributed fiber lengths would bridge the gaps that occurred during forming. This has the effect of increasing the strength of the part, although the distribution of the fiber lengths should not be so broad that the viscosity becomes too high. With reference to FIGS. 13(a) and 13(b) of the accompanying drawings, there is shown two loom preforms with limited distribution of fiber lengths. In FIG. 13(a), the preform has two sizes of fiber lengths, while the preform in FIG. 13(b) has six such sizes.

Figure 14:
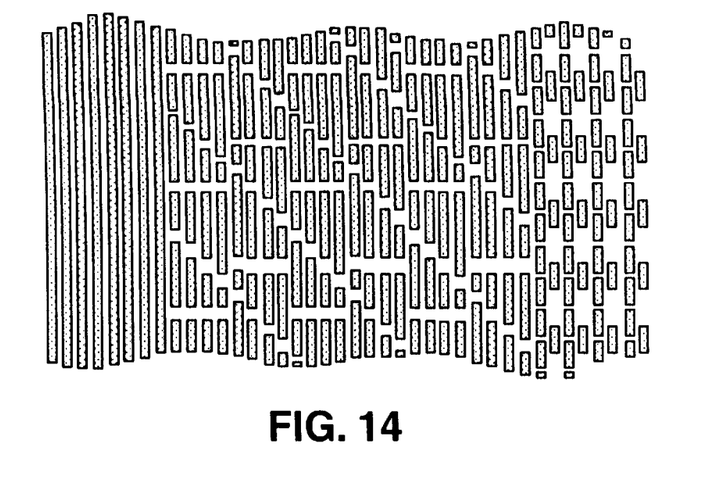
FIG. 14 shows a schematic top view of a ply of mixed fiber types.

The use of a loom allows a significant combination of mixed fiber, and this is shown in FIG. 14 of the drawings. In this Figure, a half sheet of fiber preform is illustrated, and divided into approximately three portions. The left of the Figure is the edge of the preform, while to the right of the Figure is the center of the preform. The middle portion, between the left and right portions, bridges the gap therebetween. It can be seen that the fibers on the left side, or edge of the preform, are for the most part continuous, providing for the higher strength, but low formability. On the very right of FIG. 14, representing the center of the preform, the fibers are shorter and uniformly overlapped, providing a single length discontinuous array having low strength but high formability. Between these two extremes is a distributed discontinuous array, providing both moderate strength and formability. Stacks of plies of the type illustrated in FIG. 14 may be used to form a component with little deformation at the panel edges, and large flows in the center of the panel. For example, a high strength edge could exist for fasteners while a highly formable, although weaker panel center could be shaped to avoid components within an automobile or aircraft structure.

Figure 15:
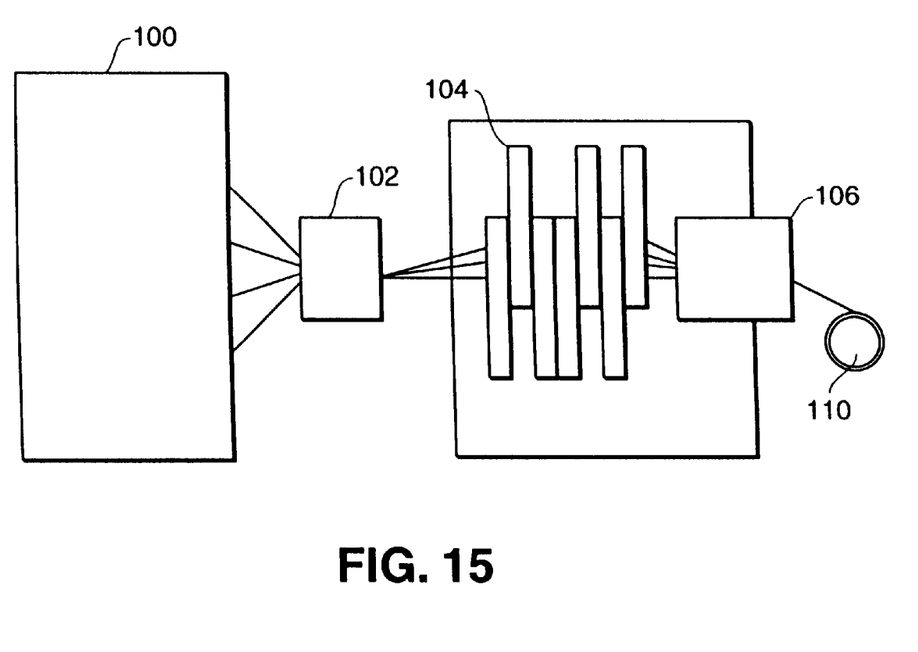
FIG. 15 is a schematic view of a modified loom showing a different embodiment of the invention for producing discontinuous fiber preforms.

Standard looms may be modified in order to produce more complex fiber preforms. With reference to FIG. 15 of the drawings, a modified loom for the production of discontinuous fiber preforms is illustrated in diagrammatic form. A conventional creel 100 with a plurality of bobbins provide a supply of warp filaments and matrix polymer fibers to a straightening station 102, where the polymer fibers are straightened before weaving. The warp filaments pass through a plurality of harnesses indicated generally at 104. A consolidation fixture 106 is provided in order to secure the fiber positions and make cuts in the weft. Calendaring may be used to bring the matrix to the fibers. Calendaring is the passing of a material between rollers to effect a change of surface finish or to laminate several layers of sheet material together. It is used in paper making to smooth the surface of the paper. It is also used in other industries. The fiber mat produced by the process collects on the take-up roll 110 at the end of the production line.

The straightening device is typically used when nylon fibers are employed in the weave. Such a device automatically straightens the fibers by heat treatment under tension, in order to remove the curl set by the spools in the creel, as described above.

In a preconsolidation unit, various options and embodiments may be available for cutting the weft fibers. A simple form of cutting would be simply to leave the weft plates in the fibers, and to weave a long roll of the pattern. The roll would then be consolidated and the fibers cut in a later process step. As another option, a preconsolidation unit may be provided that effects the matrix consolidation at the fiber crossover regions along the weaving. The device would also sever the fibers so that the fiber preform roll would be ready to cut, stack and form.

The invention is not limited to the precise details discussed here above. Various modifications of other embodiments would work equally well.

What is claimed is:

1. A composite material including highly aligned discontinuous fibers, comprising:
    a plurality of substantially aligned warp fibers which have been woven about a plurality of weft filaments, each warp fiber having a series of crossover points with adjacent warp fibers;
    a plurality of matrix polymer filaments associated with the warp fibers, the matrix polymer filaments having been treated such that each warp fiber adheres to the matrix polymer filament at least at the crossover points such that the warp fibers are attached to each other at the crossover points; and
    a series of patterned cuts having preselected characteristics in at least some of the warp fibers.

2. A compose as claimed in claim 1 wherein each warp fiber is coated with a matrix polymer film.

3. A composite as claimed in claim 1 wherein each pair of adjacent warp fibers has a matrix polymer filament therebetween such that each warp fiber and matrix polymer filament are in a staggered arrangement.

4. A composite as claimed in claim 1 wherein each weft filament is positioned between a pair of crossover points on the warp fibers.

5. A composite as claimed in claim 4 wherein the weft filament is a polymer monofilament.

6. A composite as claimed in claim 4 wherein the weft filament is a metal rod.

7. A composite as claimed in claim 1 wherein the weft filaments have been removed from the composite material, the composite material retaining its structural integrity without the presence of the weft filaments.

8. A composite as claimed in claim 1 wherein warp fibers are comprised of a monofilament.

9. A composite as claimed in claim 1 wherein matrix polymer filament is a thermoplastic and comprised of a monofilament.

10. A composite as claimed in claim 1 wherein the cuts are at right angles to the warp filament.

11. A composite as claimed in claim 2 wherein the cuts are at an angle of between 0° and 90° to the warp filament.

12. A composite as claimed in claim 1 wherein the warp fiber is nylon and the matrix polymer filament is a polyethylene film forming a matrix about the warp fiber.

13. A composite as claimed in claim 1 wherein the warp fiber is a long-discontinuous-fiber and the matrix polymer filament is comprised of poly-ether-ketone-ketone (LDF/PEKK).

14. A composite as claimed in claim 1 wherein the warp fibers have been woven about weft filaments which are at substantially right angles to the direction of the warp fibers and polymer filaments.

15. A composite as claimed in claim 1 wherein the warp fibers have been woven about weft filaments which are at an angle of between 0° and 90° to the direction of the warp fibers and matrix polymer filaments.

16. A composite as claimed in claim 1 wherein the cuts on the warp fibers are patterned whereby a warp fiber overlaps approximately half the length of the warp fibers adjacent thereto in a horizontal plane.

17. A composite as claimed in claim 1 wherein the cuts on the warp fibers are patterned so as to create variable warp fiber overlaps with adjacent warp fibers.

18. A composite as claimed in claim 1 wherein the cuts in the warp fibers are at an angle of between 0° and 90°, and the angle of the cut fixes the amount of overlap between the warp fiber and the warp fibers adjacent thereto.

19. A composite as claimed in claim 1 wherein some of the warp fibers have cuts therein and constitute discontinuous warp fibers, and other warp fibers are uncut and constitute continuous warp fibers.

20. A composite as claimed in claim 1 wherein one composite is consolidated with one or more other composites to form a panel.

21. A composite as claimed in claim 1 wherein the warp fibers are cut so as to provide a random distribution of warp fiber lengths in the composite, and wherein the composite has warp fibers of varying length.

22. A composite as claimed in claim 1 wherein one or more of the warp fiber length in the discontinuous warp fibers, the angle of the cut, the pattern of the cuts and the weft filament angle are selected so as tailor the composite material for a specific predetermined application.

23. A composite as claimed in claim 1 wherein the cuts in the warp fibers are such that the composite has between two and six sizes of warp fibers therein.

24. A composite as claimed in claim 1 wherein the warp fibers within a single composite material have mixed warp fiber length combinations.

25. A composite as claimed in claim 1 wherein the matrix polymer filament is comprised of a thermoset material.

26. A composite as claimed in claim 1 wherein the warp fibers are bonded together to form a continuous strand.

27. A composite as claimed in claim 1 wherein the weft filament is a material selected from the group consisting of: polymer sheet, rod, plate, filament, metal wire, ceramic, glass, and combinations thereof.

28. A method of forming a composite material including highly aligned discontinuous fibers, comprising:
    positioning a plurality of substantially aligned warp fibers and a plurality of matrix polymer filaments associated with the warp fibers within a loom;

weaving a plurality of weft filaments between at least first and second sets of warp fibers so as to form a material with each warp fiber having a series of crossover points with adjacent warp fibers;

treating the material such that each warp fiber adheres to the matrix polymer filament at least at the crossover points such that the warp fibers are attached to each other at the crossover points; and placing patterned cuts having preselected characteristics in a series of locations in at least some of the warp fibers.

29. A method as claimed in claim 28 wherein the weft filaments are removed from the warp fibers after the material has been treated.

30. A method as claimed in claim 28 wherein the weft filaments remain in the warp fibers and form part of the woven material.

31. A method as claimed in claim 28 wherein the weft filaments are woven into the warp fibers at about 90 degrees to the angle of the warp fibers.

32. A method as claimed in claim 28 wherein the weft filaments are woven into the warp fibers at an angle between 0 degrees and 90 degrees to the angle of the warp fibers.

33. A method as claimed in claim 28 wherein the cuts placed in the warp fibers are at about 90 degrees to warp direction.

34. A method as claimed in claim 28 wherein the cuts placed in the warp fibers are at between 0 degrees and 90 degrees to warp direction.

35. A method as claimed in claim 28 wherein treating the material comprises subjecting the material to heat and pressure to cause fusion of the warp fibers to the matrix polymer at the cross over points.

36. A method as claimed in claim 28 further comprising controlling the depth of the cut in the warp fibers.

37. A method as claimed in claim 28 wherein the weaving of the weft filaments and the warp fibers is an in-line weaving process and the warp fibers are cut as part of the in-line weaving process.

38. A method as claimed in claim 28 wherein the warp fibers are cut as a subsequent processing step after the weaving has been completed.

39. A composite material including highly aligned discontinuous fibers comprising:

a) a plurality of substantially aligned warped fibers which have been woven within a loom with respect to a plurality of weft filaments, each warped fiber having a series of cross over points with adjacent warp fibers;

b) a plurality of matrix polymer filaments associated with the warped fibers by positioning the warped fibers and the matrix polymer filaments within a loom and weaving weft filaments between first and second sets of the warped fibers, thereby forming cross over points with each adjacent warped fiber;

c) the matrix polymer filaments having been treated that each such warped fiber adheres to the matrix polymer filament at least at the cross over points, such that the warped fibers are attached to each other at the cross over points; and d) a series of pattern cuts having been formed in at least of the warped fibers and having pre-selected characteristics in at least some of the warped fibers.

* * * * *